United States Patent [19]

Benyi, Jr. et al.

[11] 4,249,859
[45] Feb. 10, 1981

[54] PRELOADED ENGINE INLET SHROUD

[75] Inventors: Alexander Benyi, Jr., Granby, Conn.; Joseph R. Kozlin, Jupiter, Fla.

[73] Assignee: United Technologies Corporation, Hartford, Conn.

[21] Appl. No.: 864,676

[22] Filed: Dec. 27, 1977

[51] Int. Cl.$^2$ ............ F01D 5/02; F02K 3/02
[52] U.S. Cl. .................... 415/79; 60/39.31; 60/226 R; 415/83; 415/217
[58] Field of Search ............ 415/83, 199.5, 208, 415/209, 210, 217, 134, 139, 79, 216, 218, 65; 60/39.31, 226 R, 262; 137/15.1

[56] References Cited

U.S. PATENT DOCUMENTS

| | | | |
|---|---|---|---|
| 2,916,874 | 12/1959 | Worobel | 60/39.31 |
| 3,330,475 | 7/1967 | Dennison | 415/79 |
| 3,375,971 | 4/1968 | Fitton | 60/226 R |
| 3,580,692 | 5/1971 | Mikolajczak | 415/217 |
| 4,008,978 | 2/1977 | Smale | 415/134 |
| 4,015,910 | 4/1977 | Harmon et al. | 415/217 |

OTHER PUBLICATIONS

Mierley, 639 O.G. 935, Abstract No. 57,291, Oct. 1950.

*Primary Examiner*—Douglas Hart
*Attorney, Agent, or Firm*—McCormick, Paulding & Huber

[57] ABSTRACT

A turbofan engine is provided with a flow splitter at the inlet of the compressor with preloaded inner and outer walls. The inner wall and outer wall are positioned generally coaxially of each other and form a generally hollow, annular shell structure which is stressed in the axial direction. The inner wall comprised of two axially separable ring sections is placed in compression while the outer wall is placed in tension. The axial stressing compensates for transient growth differentials due to thermals in the inner and outer walls, also for tolerance buildup between the components forming the walls and for deflections that are created by blow-off loads transmitted through the walls from inlet guide vanes.

14 Claims, 5 Drawing Figures

PRELOADED ENGINE INLET SHROUD

BACKGROUND OF THE INVENTION

The present invention relates to the inlet shroud of a gas turbine engine and is specifically addressed to turbofan engines in which the shroud serves as a flow splitter for separating airflow into the compressor inlet and the fan duct.

A shroud or cowling surrounding the inlet of a gas turbine engine defines the flow path for air or other working medium ingested into and diverted around the compressor section of the engine and also may serve a structural function by supporting inlet guide vanes which produce a portion of the engine thrust in most present-day turbomachines for aircraft. During the various modes of engine operation and various flight conditions, the inlet shroud experiences a variety of loads some of which are due to steady-state conditions and some of which are due to transients. Where the shroud is employed to support the inlet guide vanes of a compressor, blow-off or thrust loads must be transmitted continuously through the shroud but vary in accordance with the power output of the engine. Furthermore, transient thermal stresses due to engine and aircraft performance impose additional burdens on the shroud especially due to different flow conditions that exist over the inner and outer walls of the shroud. For example, air being ingested into the gas flow path through the compressor has a different thermal effect on the inner wall of the shroud than the air flowing over the outer wall defining the innermost part of the fan duct in a turbofan engine. Startup and acceleration and deceleration of the engine during changing load demands add further to the thermal transients which exist in this portion of the engine.

The various loads and stresses applied to the inlet shroud present numerous design problems especially when the shroud is comprised of a plurality of individual components in assembled form. Stresses imposed on rivets, screws or bolts which hold the components together result in fatigue failure after extended periods of exposure, and shorten the useful lifetime of the engine. Also, the walls which extend axially of the engine are frequently formed by a series of axially adjacent rings or sections which must not separate when subjected to the various loads and thermal stresses associated with engine operation. Tolerance buildup for serially connected components of this type must also be accounted for since the cumulative effect of deflections due to loading and tolerances may produce an unwanted separation of components.

While most of the above problems can be addressed by heavier and additional fasteners as well as by thicker wall sections, the net result is an overall increase in engine weight and cost and a reduction in the power-to-weight ratio. It is, therefore, preferable that the problem be addressed by improved design which does not impose performance penalties nor increase engine cost.

It is, accordingly, a general object of the present invention to provide an inlet shroud or flow splitter which accommodates the various loads and stresses by virtue of its design and without the penalties of additional weight or more exotic and costly materials. It is a further object of the invention to provide a shroud which accommodates any tolerance buildup that alone or in combination with applied loads might separate the shroud components under the stress and strain of flight conditions.

SUMMARY OF THE INVENTION

The present invention resides in a preloaded or prestressed inlet shroud for a gas turbine engine. The shroud may serve the function of a flow splitter which separates the air flow into the compressor and through the fan duct of a turbofan engine.

The shroud is comprised of inner and outer annular walls which are positioned in generally coaxial relationship with each other and define the engine inlet. The walls are joined at the front or leading portions to form the lip of the inlet and extend axially rearward from the lip in spaced relationship to trailing portions. Thus, the walls form a hollow, annular shell structure surrounding the compressor inlet.

Coupling means connect with the trailing portions of the inner and outer walls and are designed to hold the inner wall axially preloaded relative to the outer wall. In one form, the coupling means comprises a plurality of axially extending bolts which clamp or draw together two overlapping flanges associated respectively with the inner and outer walls. In the unstressed condition, the flanges are separated by a predetermined amount proportional to the level of stressing desired in the walls. Where, for example, the inner wall is comprised of two axially separable sections, the inner wall is preloaded in compression, and the outer wall reacting to such compressive loads is placed in tension.

The preloaded shroud is more suitably structured to withstand the various loads and stresses to which shrouds are exposed during various modes of engine and aircraft operation. The improved quality of the shroud is obtained without adding to weight or cost, and is inherent in the new design.

DESCRIPTION OF THE PREFERRED EMBODIMENTS

Figure 1:
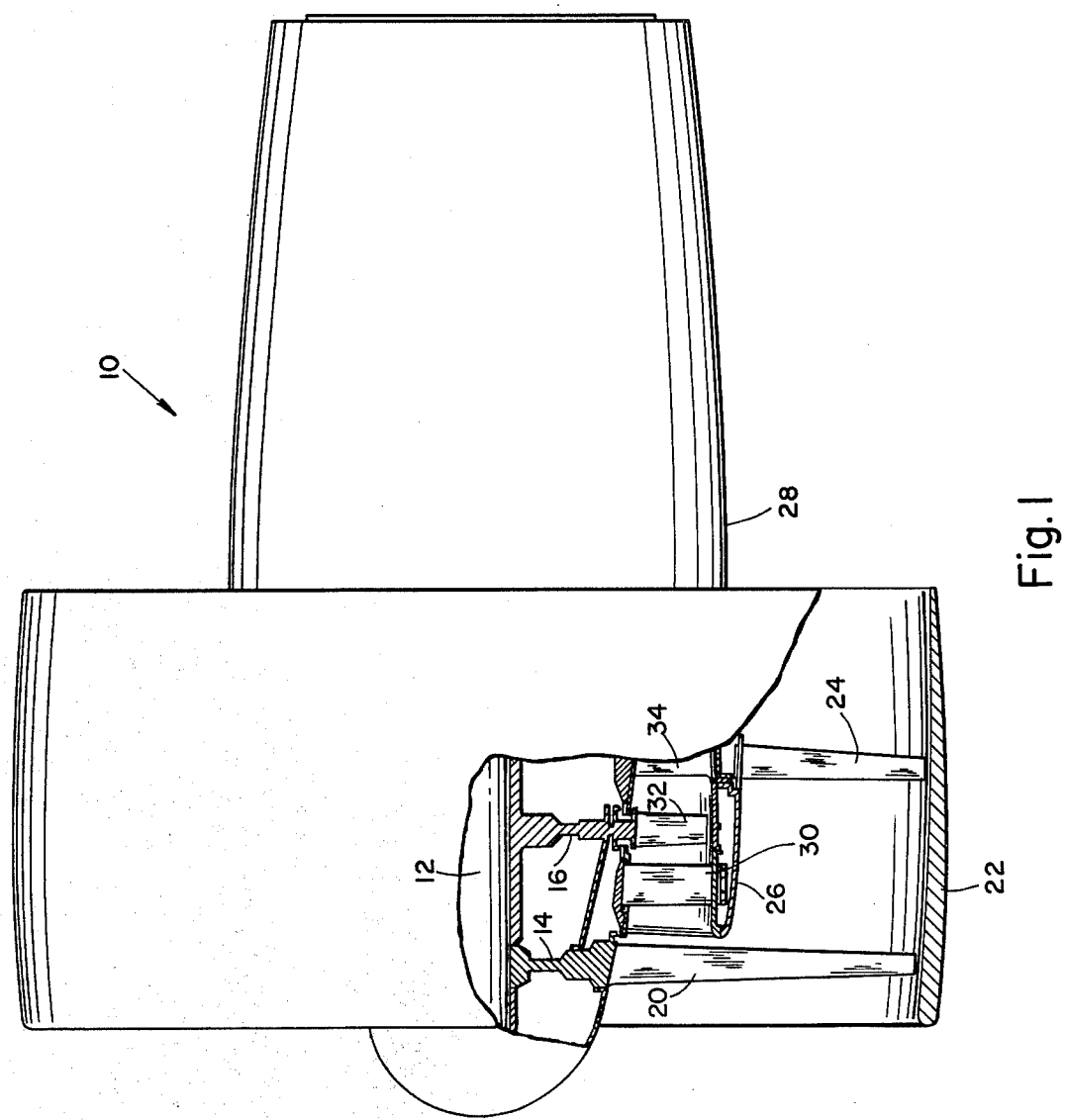
FIG. 1 is a side elevation view of a ducted turbofan engine, partially in section and employing the inlet shroud of the present invention as a flow splitter.

FIG. 1 illustrates a gas turbine engine, generally designated 10, of the turbofan design. The fan portion of the engine as well as the inlet stages of the low-pressure compressor are illustrated in section for reference. In general, the gas generating portion of the engine includes a turbine rotor shaft 12, which is shown connected in driving relationship with both the fan rotor 14 and the first stage compressor disc 16. It will be understood, however, that the shaft is also connected to other stages of the compressor.

A plurality of closely spaced fan blades 20 are attached to the rotor 14 and extend radially outward of the engine to the cylindrical fan shroud 22 in conventional fashion. The shroud is supported from the engine casing by means of a plurality of circumaxially spaced fan exit guide vanes 24. The shroud 22 extends axially rearward over the shroud or flow splitter 26 surrounding the compressor inlet and has a skirt section which extends further rearward beyond the fan exit vanes 24 to define an annular fan duct between the flow splitter 26 and engine casing 28 and the interior surface of the shroud 22. Thus, air ingested by the fan blades 20 is divided into one portion for the compressor and another portion bypassing the compressor and discharged from the trailing edge of the fan duct for thrust.

The flow splitter 26 is an annular component circumscribing the engine axis and extends rearwardly parallel to the engine axis. In longitudinal section, the inner and outer walls of the splitter form a generally aerodynamic shape in order to divide the fan air between the compressor inlet and fan duct with minimal turbulence. The portion of the air entering the compressor first passes over an annular array of inlet guide vanes 30 mounted in the splitter and then is pumped further into the compressor by the first stage rotor blades 32 on the periphery of the shaft-driven rotor disc 16. The air in conventional fashion passes through a second stage of guide vanes 34 and continues rearwardly through multiple compressor stages to develop a desired static pressure. The air is then combined with fuel in a combustion process and exhausts through a turbine section and diffuser at the rear of the engine.

Figure 2:
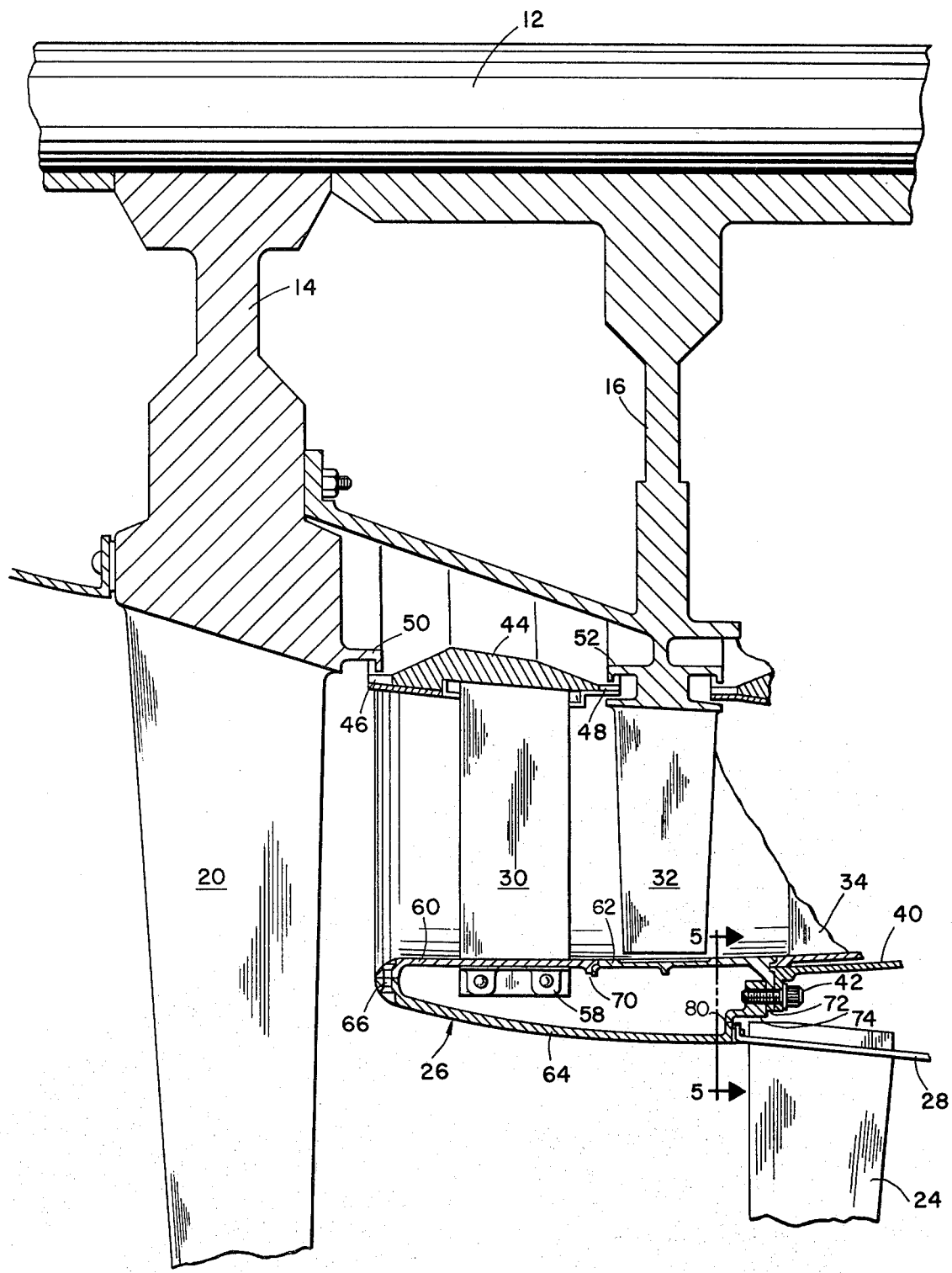
FIG. 2 is an enlarged fragmentary sectional view of the turbofan engine along the engine axis and shows the flow splitter between the inlet to the compressor and the fan duct.

FIGS. 2–5 illustrate details of the construction and function of the flow splitter 26 within the turbofan engine 10. In FIG. 2 the trailing portion of the flow splitter is supported from the engine casing 40 by a plurality of clamping bolts 42. The splitter at its leading or forward portion serves as the primary supporting structure for the inlet guide vanes 30 at their radially outer ends. The inner ends of the guide vanes are held in a stabilizing ring 44 which includes a seal land 46 situated in close running relationship with the knife edge 50 on the fan rotor 14 and another seal land 48 situated in close running relationship with the knife edge 52 on the first stage rotor 16. It will be understood that since the ring 44 is not supported by any other structure internally of the engine, all blow-off or thrust loads developed by the guide vanes 30 must be transmitted to the engine casing 40 through the flow splitter 26. Such a blow-off load F is illustrated vectorially in FIG. 3.

Figure 3:
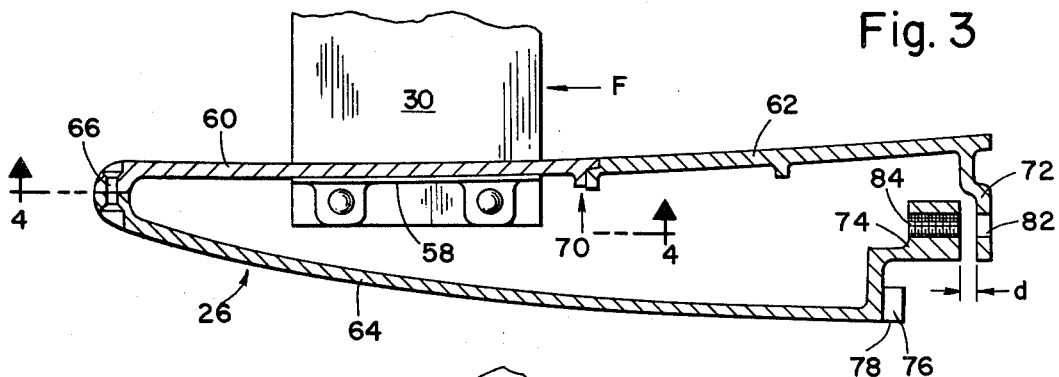
FIG. 3 is a sectional view of the flow splitter at an intermediate stage of assembly.
Figure 4:
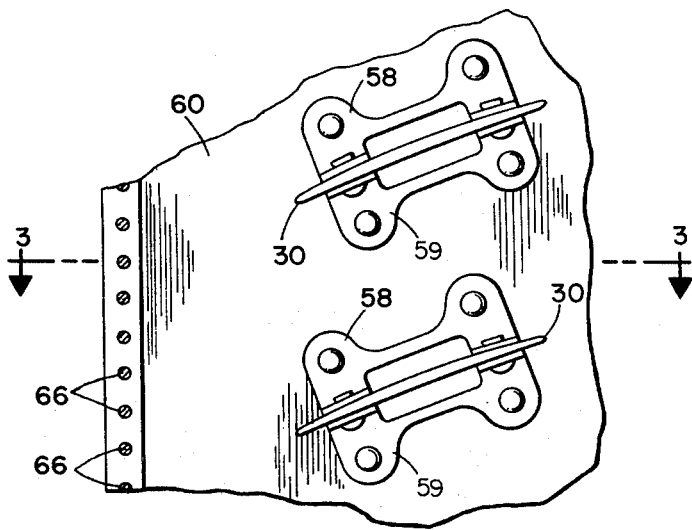
FIG. 4 is a fragmentary sectional view of the inner wall of the flow splitter and shows the mounts for the inlet guide vanes as seen along the sectioning line 4—4 in FIG. 3.

To transmit the blow-off loads, the aerodynamically shaped guide vanes 30 extend through close fitting slots in the inner wall of the flow splitter and are held in place by means of angular mounting brackets 58 and 59 on opposite sides of each blade as shown in FIGS. 3 and 4. The brackets are riveted to the inner wall of the flow splitter and to the outer end of the blades 30 at each side and thus hold the blades rigidly in place.

The flow splitter 26 itself is a composite structure comprised of two cylindrical wall sections or inner shell rings 60 and 62 in axially separable and abutting relationship, and an outer cylindrical wall section or shell ring 64 mounted coaxially of the inner rings 60 and 62. The inner ring 60 is joined with the outer ring 64 at the front or leading portion by an annular series of fastening rivets 66 to form the lip of the compressor inlet. From the lip, the rings 60 and 64 extend axially rearward in spaced relationship toward the trailing portion of the flow splitter. The ring 60 extends to a position behind the inlet guide vanes 30 and there engages the second inner ring 62 at a stepped, overlapping joint 70 shown most clearly in FIG. 3. The second ring 62 extends rearwardly from the joint 70 and terminates at its trailing portion with a flange 72 projecting radially outward. The joint 70 has both radially and axially overlapping surfaces and has an interference fit to precisely align the rings 60 and 62 in coaxial and generally sealed relationship when they are assembled to form the inner wall of the splitter.

Figure 5:
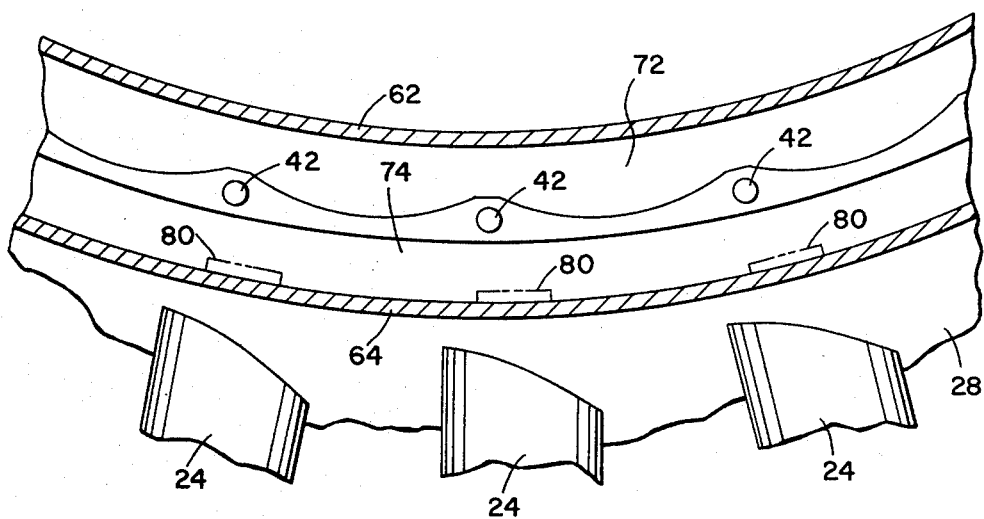
FIG. 5 is a fragmentary sectional view of the flow splitter taken transverse to the engine axis as seen along the sectioning line 5—5 in FIG. 2.

In a similar manner, the outer ring 64 extends axially rearward over both inner rings to form the outer wall of the splitter, and has an inwardly directed flange 74 connected with its trailing portion. The trailing portion of the ring 64 also includes an attachment rib 76 having a series of circumaxially spaced notches 78 for receiving tabs 80 at the forward end of the engine shroud 28 as shown in FIGS. 2 and 5. The flange 74 has threaded bolt holes 84 in FIG. 3 registering with unthreaded holes 82 in the flange 72 so that the clamping bolts 42 illustrated in FIGS. 2 and 5 can couple the flanges together and thus complete the hollow, annular shell structure forming the flow splitter.

Assembly of the flow splitter in an engine is readily accomplished by attaching the inlet guide vanes 30 to the ring 60 and then placing the inner rings 60 and 62 with the vanes attached adjacent the engine casing 40. The outer ring 64 is then slipped over the rings 60 and 62. In the latter step, the lugs formed in the scalloped flange 74 as illustrated most clearly in FIG. 5 are worked helically between the inlet guide vanes projecting through the ring 60 to obtain a position registering with the bolt holes in the flange 72 at the rear of the inner ring 62. The rivets 66 are then installed and are inserted radially through the rings 60 and 64 at the leading edge of the splitter before the bolts 42 are tightened at the rear. With the rivets installed, the bolts are tightened uniformly about the engine axis to preload the splitter walls.

In accordance with the present invention, the inner and outer walls of the flow splitter 26 are preloaded during assembly with axially directed compressive and tension forces or stresses. In particular, the inner wall comprised of the axially separable rings 60 and 62 is placed in compression while the outer wall formed by the ring 64 is placed in tension. The compressive and tension forces are reacted entirely within the shell structure of the splitter by the rivets 66 at the leading portions of the splitter and the bolts 42 coupling the flanges 72 and 74 together at the trailing portion of the splitter.

It is contemplated that other load-carrying means at the rear including engine casings can be coupled to the inner and outer walls to apply or hold the desired preloads.

As shown in FIG. 3, the flanges 72 and 74 of the inner and outer walls of the flow splitter 26 are separated when the splitter is in the partially assembled condition and the walls are unstressed. The amount of the separation d is proportional to the amount of preloading or stress that is developed in the inner and outer walls when the flow splitter is completely assembled in the engine as illustrated in FIG. 2. The clamping bolts 42 draw the flanges 72 and 74 together during assembly and, at the same time, apply the preload stresses to the flow splitter walls.

Thus, the separation d is determined beforehand by engineering analysis in accordance with the various thermal stresses, loads and machining tolerances which are intended to be accounted for by the preloads. For example, the amount of blow-off load F in FIG. 3 carried by the ring 60 from all of the inlet guide vanes 30 is determinable from the gas dynamics of the engine design. The thermal stresses that are created under varying modes of engine operation due to internal heat and the air flowing over the inner rings 60 and 62 at the outer extremity of the compressor inlet and the fan air flowing over the outer ring 64 defining the innermost limits of the fan duct are also taken into consideration. Furthermore, the tolerance buildup expected between the various rings 60, 62 and 64 is also determinable on a statistical or a measured basis.

Several advantages are obtained by the preloaded flow splitter 26. With the inner wall comprised of the separable rings 60 and 62 in compression, thermal stresses and blow-off loads developed by the inlet guide vanes 30 can be transmitted to the engine casing 40 without fear of the joint 70 coming apart even under the extremes of thermal transients and large tolerance buildup. The splitter is also more rigid with compressive and tensile forces in the walls and thus is less susceptile to vibratory instabilities due to external excitations. In the unstressed structure vibrations and cyclic loading of the rivets during various modes of engine operation cause metal fatigue, but the preload maintains a constant state of shear across the rivets to avoid fatigue and failure. The net result is a flow splitter in which the integrity of the structure is maintained in spite of the hostile environment and the loads transmitted to the engine casing. No compromise in design efficiency is required due to heavier wall sections or more numerous and stronger couplings and fastenings between the several elements forming the splitter.

While the present invention has been described in a preferred embodiment, it should be understood that numerous modifications and substitutions can be had without departing from the spirit of the invention. Although the invention has been described as a flow splitter in a ducted turbofan engine, it will be understood that basically the same structure can also be used as the compressor inlet shroud on non-fan engines. The stepped overlapping joint between the ring numbers 60 and 62 is basically comprised by an annular recess in one of the members confronting an annular projection in the other. Other projection-recess joints may be utilized between the joined rings. The inner wall of the flow splitter may also be comprised of a single ring such as the outer wall without obviating the present invention since the prestressed walls alone minimize cyclic loading on rivets at the lip of the inlet. Accordingly, the present invention has been described in a preferred embodiment by way of illustration rather than limitation.

We claim:

1. A prestressed flow splitter in a turbofan engine projecting forwardly at the front of the engine for dividing ingested fan air between the compressor inlet and the fan duct comprising:

an annular shell structure surrounding the compressor inlet and having an annular inside wall defining the outer extremity of the compressor inlet duct and an annular outside wall defining the innermost limits of the fan duct surrounding the compressor inlet, the inside and outside walls being joined at the lip of the compressor inlet and having separate trailing portions extending axially rearward, the lip projecting forwardly and being unsupported at the leading edge of the splitter, and the trailing portions of the inside and outside wall being connected to the engine to support the forward projecting lip; and load carrying means connected between the trailing portion of the inside wall and the trailing portion of the outside wall for axially preloading the inside wall in compression against the outside wall in the assembled condition of the flow splitter, whereby the inside and outside walls are reactively stressed in the non-operative engine condition.

2. A prestressed flow splitter as defined in claim 1 wherein the inside wall of the annular shell structure is comprised by two axially adjacent ring members engaging each other for coaxial alignment.

3. A prestressed flow splitter as defined in claim 2 wherein one of the two ring members has an annular recess confronting the other ring member and the other ring member has an annular projection received by the recess in the assembled condition of the engine.

4. A prestressed flow splitter in a turbofan engine as defined in claim 3 further including a vane mount connected to one of the axially adjacent ring members and the other of the two adjacent ring members having no vane mount therein.

5. A prestressed flow splitter in a turbofan engine as defined in claim 1 wherein the inside wall and the outside wall are formed by separate components and are joined at the lip of the compressor inlet by means of fasteners.

6. A prestressed flow splitter as defined in claim 5 wherein the fasteners joining the inside and outside wall at the lip are rivets.

7. A prestressed flow splitter as defined in claim 1 wherein the trailing portions of the inside and outside walls of the shell structure include flanges; and the load carrying means includes means drawing the flanges together and placing the inside wall in compression and the outside wall in tension.

8. A preloaded inlet shroud forming the flow splitter between the compressor and fan in a turbofan engine comprising: inner and outer annular walls positioned coaxially of and defining the inlet, and joined together exclusive of other supporting structure at the leading edge portions thereof to form a freely projecting lip of the inlet, the walls also extending axially rearward in spaced relationship from the lip to trailing portions thereby forming a hollow annular shell structure; and coupling means connected with the trailing portions of the inner and outer walls for holding the inner wall axially preloaded in compression against the outer wall in the inoperative engine condition and for connecting the preloaded walls to the engine.

9. A preloaded shroud for a gas turbine engine as defined in claim 8 wherein the trailing portion of the outer wall includes an inwardly projecting flange, the trailing portion of the inner wall includes an outwardly projecting flange spaced axially to the rear of the flange on the outer wall in the unstressed condition of the walls joined at the leading portion; and the coupling means comprises means clamping the flanges together in the assembled condition of the shroud.

10. A preloaded shroud for a gas turbine engine as defined in claim 8 wherein the inner wall of the shroud is comprised by two separable cylindrical wall sections, one section forward of the other and both sections in axially abutting relationship.

11. A preloaded shroud for a gas turbine as defined in claim 10 further including a mount for an inlet guide vane connected to the forward cylindrical wall section.

12. A preloaded inlet shroud for a gas tubine engine as defined in claim 8 wherein: the inner annular wall and the outer annular wall are separate members joined together at the projecting lip of the inlet by means of a plurality of fasteners spaced along the lip whereby the opposite stresses in the respective walls are reacted through the plurality of fasteners at the projecting lip of the inlet.

13. A preloaded inlet shroud as defined in claim 12 wherein the inner wall is further comprised by two axially separable sections.

14. A preloaded inlet shroud as defined in claim 12 wherein the fasteners are rivets extending radially of the inlet between the inner and outer walls.

* * * * *